US006755534B2

(12) United States Patent
Veligdan et al.

(10) Patent No.: US 6,755,534 B2
(45) Date of Patent: Jun. 29, 2004

(54) PRISMATIC OPTICAL DISPLAY

(75) Inventors: James T. Veligdan, Manorville, NY (US); Leonard DeSanto, Dunkirk, MD (US); Calvin Brewster, North Patchogue, NY (US)

(73) Assignee: Brookhaven Science Associates, Upton, NY (US)

( * ) Notice: Subject to any disclaimer, the term of this patent is extended or adjusted under 35 U.S.C. 154(b) by 0 days.

(21) Appl. No.: 09/939,069

(22) Filed: Aug. 24, 2001

(65) Prior Publication Data

US 2003/0038924 A1 Feb. 27, 2003

(51) Int. Cl.[7] .................... G03B 21/26; G03B 21/14; G03B 21/22; G03B 21/56; G03B 21/28
(52) U.S. Cl. ................... 353/38; 353/34; 353/74; 353/78; 359/443; 359/459; 385/131; 385/132
(58) Field of Search ................... 353/34, 35, 38, 353/74, 77, 78; 359/443, 459; 385/901, 129, 130, 131, 132

(56) References Cited

U.S. PATENT DOCUMENTS

| 3,253,500 A | 5/1966 | Hicks, Jr. .................... 385/120 |
| 3,874,783 A | 4/1975 | Cole .......................... 385/115 |
| 4,090,104 A | 5/1978 | Vann et al. .................. 313/422 |
| 4,116,739 A | 9/1978 | Glenn ........................ 156/169 |
| 4,344,668 A | 8/1982 | Gunther et al. ............. 385/120 |
| 4,418,986 A | 12/1983 | Yata et al. ................... 359/456 |
| 4,469,402 A | 9/1984 | Yata et al. ................... 359/457 |
| 4,497,860 A | 2/1985 | Brady, Jr. .................... 428/156 |
| 4,586,781 A | 5/1986 | Gunther et al. ................ 359/15 |
| 4,674,836 A | 6/1987 | Yata et al. ................... 359/457 |
| 4,729,631 A * | 3/1988 | Takahashi et al. .......... 359/456 |
| 4,792,209 A * | 12/1988 | Laine et al. ................. 359/443 |
| 4,823,246 A | 4/1989 | Dilouya ...................... 362/328 |
| 4,874,228 A | 10/1989 | Aho et al. ..................... 349/62 |
| 4,906,070 A | 3/1990 | Cobb, Jr. .................... 359/834 |
| 4,919,513 A | 4/1990 | Nakakuki et al. ........... 385/127 |
| 5,040,878 A | 8/1991 | Eichenlaub .................. 349/62 |

(List continued on next page.)

OTHER PUBLICATIONS

Veligdan, "Unique Interactive Projection Display Screen", Sep. 29, 1997, 7 pages.
Beiser, et al., "Ten Inch Planar Optic Display", Proceedings of the International Society for Optical Engineering (SPIE), vol. 2734, Apr. 1996. 9 pages.
Yoder, "The State–of–the–Art in Projection Display: An Introduction of the Digital Light Processing DLP", Texas Instruments Web Site, Mar. 1997, 5 pages.
DeSanto, et al., "Polyplanar Optical Display Electronics", Proceedings of the International Society (SPIE), vol. 3057, Apr. 1997, 12 pages.
Dai Nippon Corp, "dnp Black Stripe Screen," internet brochure, Mar. 2000, three pages.
3M, "3M Transmissive Right Angle Film II," product literature, 2 pages, 1996.

*Primary Examiner*—Russell Adams
*Assistant Examiner*—Magda Cruz
(74) *Attorney, Agent, or Firm*—Reed Smith LLP; William J. McNichol, Jr.; Matthew J. Esserman

(57) ABSTRACT

A spatially modulated light beam is projected, reflected, and redirected through a prismatic optical panel to form a video image for direct viewing thereon.

4 Claims, 4 Drawing Sheets

U.S. PATENT DOCUMENTS

| | | | |
|---|---|---|---|
| 5,066,947 A | 11/1991 | Du Castel | 340/815.42 |
| 5,130,898 A | 7/1992 | Akahane | 362/31 |
| 5,151,956 A | 9/1992 | Bloemer | 385/11 |
| 5,274,406 A | 12/1993 | Tejima et al. | 353/70 |
| 5,381,502 A | 1/1995 | Veligdan | 385/115 |
| 5,394,308 A | 2/1995 | Watanabe et al. | 362/31 |
| 5,422,691 A | 6/1995 | Ninomiya et al. | 353/69 |
| 5,455,882 A | 10/1995 | Veligdan | 385/116 |
| 5,471,348 A | 11/1995 | Miller et al. | 359/837 |
| 5,477,422 A | 12/1995 | Hooker et al. | 362/29 |
| 5,481,385 A | 1/1996 | Zimmerman et al. | 349/62 |
| 5,521,725 A | 5/1996 | Beeson et al. | 349/95 |
| 5,543,870 A * | 8/1996 | Blanchard | 353/74 |
| 5,565,839 A | 10/1996 | Poss | 340/331 |
| 5,594,561 A | 1/1997 | Blanchard | 349/59 |
| 5,600,455 A | 2/1997 | Ishikawa et al. | 349/57 |
| 5,625,736 A | 4/1997 | Veligdan | 385/120 |
| 5,642,449 A | 6/1997 | Phillips | 385/33 |
| 5,668,907 A | 9/1997 | Veligdan | 385/120 |
| 5,684,905 A | 11/1997 | Sugawara et al. | 385/120 |
| 5,696,862 A | 12/1997 | Hauer et al. | 385/88 |
| 5,716,118 A | 2/1998 | Sato et al. | 353/98 |
| 5,718,497 A | 2/1998 | Yokoyama et al. | 362/31 |
| 5,735,590 A | 4/1998 | Kashima et al. | 362/31 |
| 5,764,845 A | 6/1998 | Nagatani et al. | 385/146 |
| 5,771,328 A | 6/1998 | Wortman et al. | 385/146 |
| 5,779,337 A | 7/1998 | Saito et al. | 362/31 |
| 5,797,668 A | 8/1998 | Kojima et al. | 362/31 |
| 5,821,911 A | 10/1998 | Jachimowicz | 345/7 |
| 5,838,865 A | 11/1998 | Gulick | 385/121 |
| 5,844,720 A | 12/1998 | Ohara et al. | 359/599 |
| 5,852,514 A | 12/1998 | Toshima et al. | 359/599 |
| 5,914,760 A | 6/1999 | Daiku | 349/65 |
| 5,917,664 A | 6/1999 | O'Neill et al. | 359/831 |
| 5,926,601 A | 7/1999 | Tai et al. | 385/146 |
| 5,940,565 A | 8/1999 | Sugawara | 385/28 |
| 5,951,138 A | 9/1999 | Ishikawa | 362/31 |
| 6,002,826 A | 12/1999 | Veligdan | 385/120 |
| 6,011,601 A | 1/2000 | Kojima | 349/62 |
| 6,012,816 A | 1/2000 | Beiser | 353/122 |
| 6,020,090 A * | 2/2000 | Takada et al. | 430/1 |
| 6,031,954 A | 2/2000 | Higuchi | 385/120 |

* cited by examiner

PRISMATIC OPTICAL DISPLAY

STATEMENT REGARDING FEDERALLY SPONSORED RESEARCH OR DEVELOPMENT

This invention was made with Government support under Contract No. DE-AC02-98CH10886 awarded by the Department of Energy. The Government has certain rights in this invention.

BACKGROUND OF THE INVENTION

The present invention relates generally to optical panels, and more specifically to thin optical display panels.

Optical display screens are found in many common applications such as televisions, computer displays, and displays for industrial and scientific equipment. Common display screens form images using a cathode ray tube (CRT) which is relatively long and requires a large enclosure.

Rear projection television (RPTV) displays utilize image light which is projected to the back side of a screen for displaying the image on its front side. The resulting enclosures for these RPTV displays have a considerable depth for accommodating the necessary optical components for focusing, enlarging, and directing the image light.

Thin display screens of various forms are continually being developed for replacing CRTs to minimize the screen enclosure and overall weight. A common thin panel uses a liquid crystal display (LCD) for modulating light therethrough for creating video images.

Another type of thin display panel includes thin optical waveguides laminated together in a thin wedge shape through which image light is internally reflected between a narrow inlet face and a large outlet screen. U.S. Pat. No. 5,381,502 is one of a series of patents based on this technology being developed for improving performance of thin display panels.

In view of the varying complexity and depth of these forms of displays, it is desired to provide a new form of video display which is thin, simple, and relatively inexpensive.

BRIEF SUMMARY OF THE INVENTION

A spatially modulated light beam is projected through a prismatic optical panel to form a video image for direct viewing thereon.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
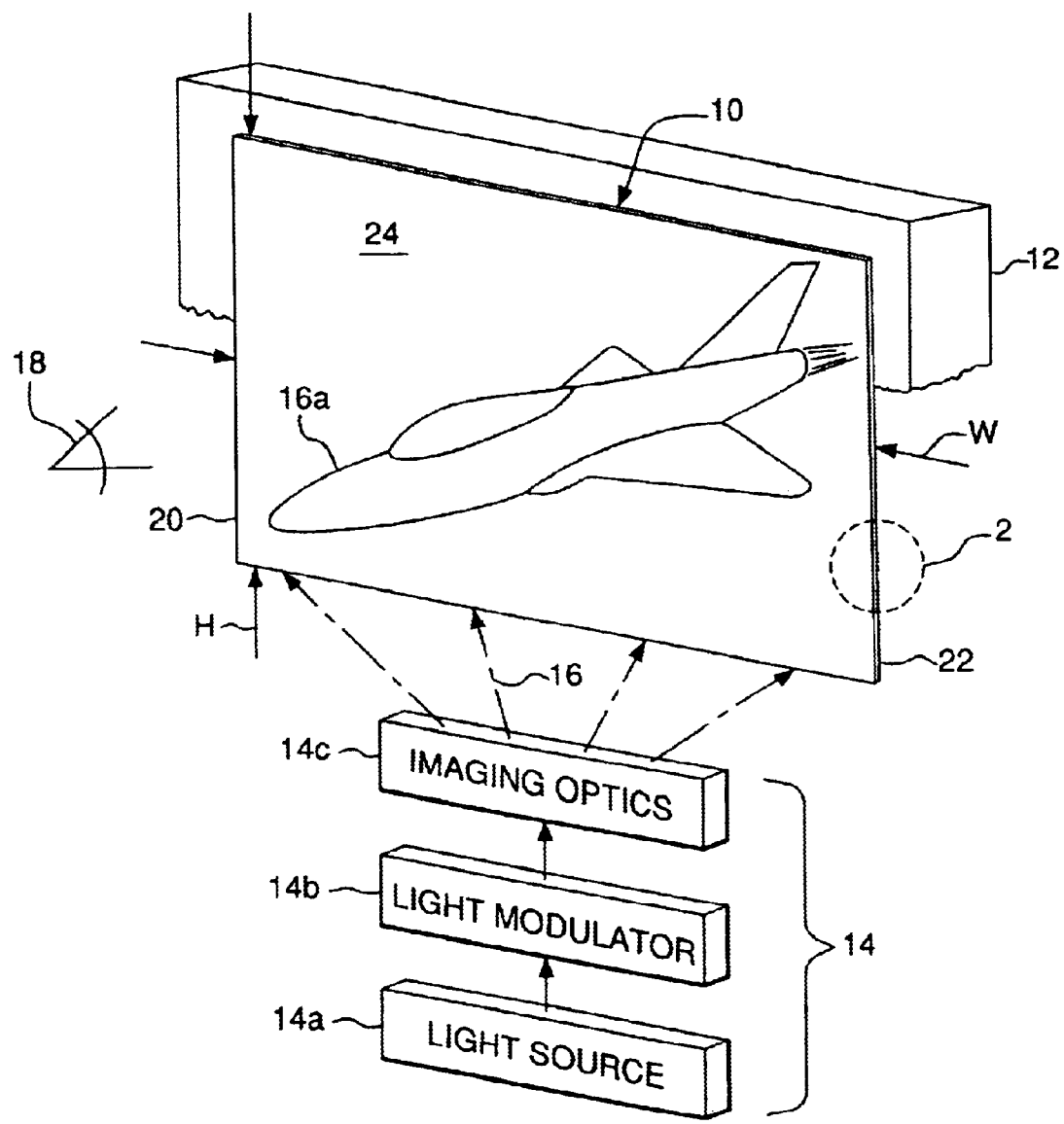
FIG. 1 is a schematic view of a video display in accordance with an exemplary embodiment of the present invention.

Illustrated in FIG. 1 is a video image display in accordance with an exemplary embodiment of the present invention. The display apparatus is an assembly of components including an optical panel 10 sized in horizontal width W and vertical height H for any desired application. An exemplary large panel video display screen is illustrated, and may have a diagonal screen measurement of about a meter for example. The optical panel may be suitably mounted in a cabinet or enclosure 12, shown in part, for mounting therein all working components thereof if desired.

The optical panel 10 cooperates with a projector 14 suitably configured for projecting image light 16 in the form of a beam through the panel for producing a video image 16a for direct viewing by an observer 18 facing the front of the panel. The projector 14 may take any conventional form capable of projecting a viewable image.

For example, the image beam 16 is initially generated as plain, unmodulated light in a suitable light source 14a, which may be a bright incandescent bulb, or laser, or any other suitable light source. The initial light may be monochromatic, or have color as desired.

The plain light is then spatially modulated in a modulator 14b for creating individual picture elements, or pixels, which define the desired video image or pattern. The modulator may take any conventional form such as a liquid crystal display (LCD) or a Digital Micromirror Device (DMD).

The LCD is a light transmissive device having portions which are selectively rendered opaque for selectively interrupting the light at selected pixels. The DMD is a light reflective device and has individual micromirrors which are selectively tiltable to reflect the light toward the panel or away therefrom for defining corresponding pixels.

Suitable imaging optics 14c, which may include folding mirrors and lenses, are optically aligned between the panel and the light modulator for laterally or horizontally and vertically or transversely scaling and focusing the image beam as required over the back side of the panel for transmission therethrough. Although the light source 14a, modulator 14b, and imaging optics 14c are illustrated schematically as being located in a particular position, the location of each of these components may differ as desired.

Figure 2:
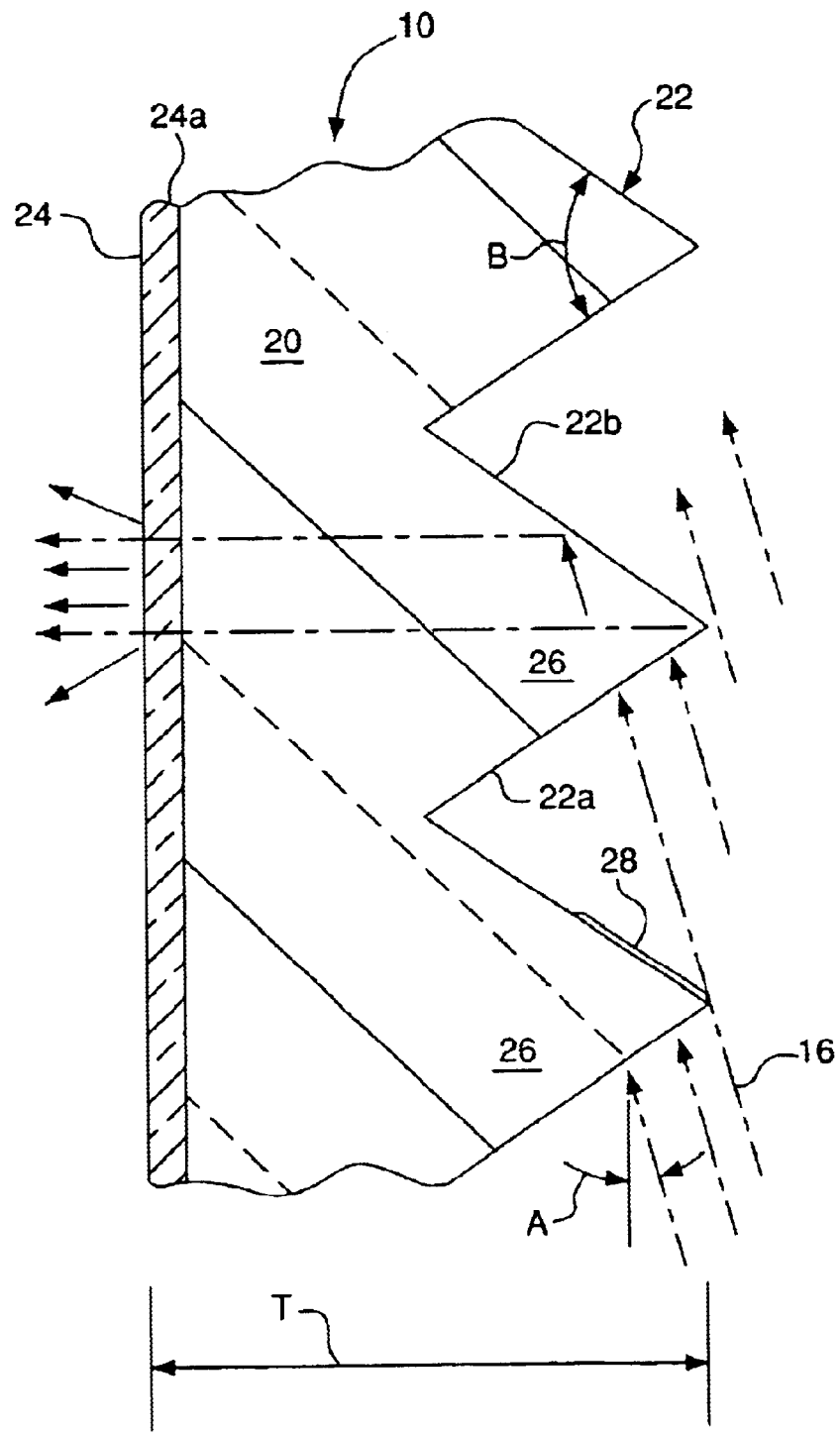
FIG. 2 is an enlarged sectional side view of the display illustrated in FIG. 1 and taken within the circle labeled 2 in FIG. 1.

An enlarged section of the panel 10 is illustrated in more particularity in FIG. 2. The panel 10 is preferably in the form of an optically transparent body or film 20 which may have any suitable material composition such as glass or plastic, with an exemplary index of refraction of about 1.56 for plastic.

The panel in sheet form has a prismatic first side 22 that defines an inlet face optically aligned with the projector for receiving the image beam 16 therefrom at an acute angle of incidence A. The panel is preferably transparent for internally reflecting the image beam at the first side 22 for display from an opposite second side 24 which defines an outlet screen. The panel may also optionally be tinted to enhance the contrast of the display. The tinting may be provided, for example, by injecting dark (e.g. black) dye molecules or particulates (e.g. carbon particulates) into the liquid plastic as the body or film 20 is being manufactured thereby giving the entire body or film 20 a dark appearance. Alternatively, instead of tinting the body or film 20 itself, the tint can be provided in an additional layer at the screen 24 (not shown).

The inlet face 22 includes a multitude of optically transparent serrations or prisms 26 for receiving the image beam 16 from the projector. The prisms are preferably integrally formed with the body or film 20 in a unitary optically transmissive member for transmitting the image beam through the film by total internal reflection therein for display at the screen 24.

The screen 24 may not have another element thereon, or it may include a light diffuser 24a for diffusing or spreading the image beam 16 for increasing the field of view. The surface layer of the film 20 may itself be suitably frosted for diffusing the image beam 16 in producing the image viewable by the observer. Or, the diffuser 24a may be a separate light diffusing member or sheet laminated against the smooth side of the film 20 for diffusing the image light. Examples of such diffusers include holographic diffusers commercially available from Physical Optics Corp., Torrance, Calf., and lenticular screens commercially available from Dai Nippon Corp. (DNP), Copenhagen, Denmark, through U.S. distributors. The diffuser 24a may itself optionally include a tint of the type which may be used in the body or film 20 as described above.

In the exemplary embodiment illustrated in FIG. 2, the panel first and second sides 22,24 are directly opposite to each other for minimizing the overall thickness of the panel. Each of the prisms 26 is in the preferred form of a triangle having a transparent first facet 22a which first receives the image beam 16 and channels the light through the facet and inside the prism.

Each prism also includes an opposite second facet 22b which may also be transparent and intersects the first facet at a corresponding apex having an acute included prism or apex angle B therebetween. The optical panel has a thickness T measured from the apexes of the several prisms and the opposite second side outlet screen 24 or, if included, a diffuser 24a.

The length of the prisms are parallel to each other, and first and second facets 22a,b of adjoining prisms define V-grooves therebetween so that the entire panel first side is uniformly serrated.

Figure 3:
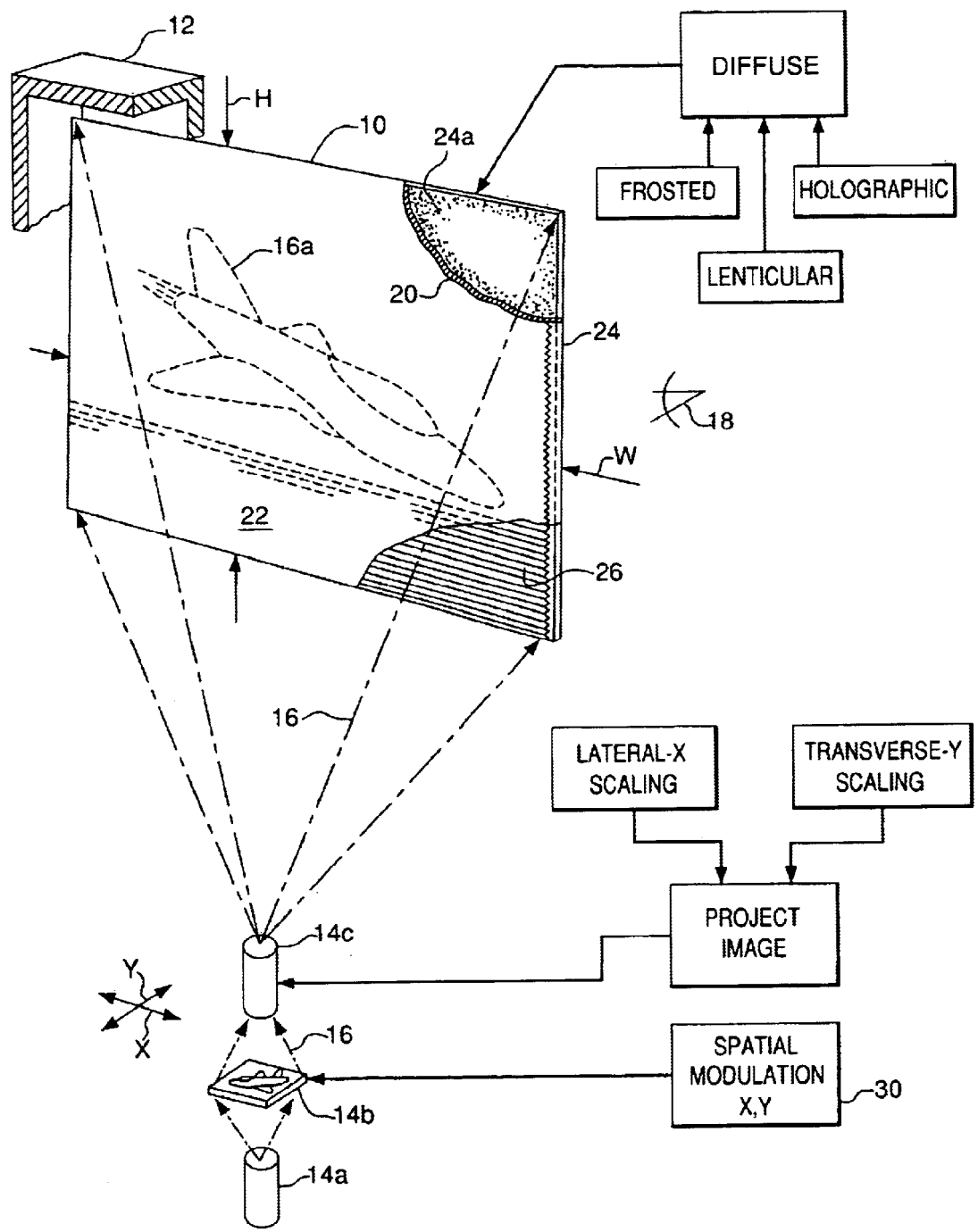
FIG. 3 is a backside view of the display illustrated in FIG. 1 including a corresponding method flowchart in accordance with an exemplary embodiment.

The prisms 26 preferably extend in length laterally or horizontally across the full width of the panel as shown in FIG. 3, and are spaced apart transversely or vertically across the full height of the panel. In this way, the prismatic inlet side may be edge-lighted to substantially reduce the overall thickness or depth of the display enclosure.

The projector is inclined toward the panel inlet side to face the first facets 22a collectively toward the incident image beam 16 for channeling the light inside each prism wherein it is internally reflected off the inside surface of the corresponding second facets 22b. The second facets 22b are preferably transparent and exposed to ambient air which has an index of refraction of 1.0.

Since the index of refraction outside the second facets 22b is less than the refractive index of the prisms themselves, total internal reflection of the image light is obtained with correspondingly high light transmission efficiency. The image beam thusly enters the optical panel through the several first facets 22a and is internally reflected off the back sides of the second facets 22b and redirected through the body or film 20 substantially perpendicularly outwardly from the screen 24 toward the observer.

Alternatively, the second facets 22b may optionally include a truncated reflective or mirror coating 28 at the prism apex as shown in FIG. 2 for obtaining internal specular reflection inside the prisms, but specular reflection is less efficient than total internal reflection and would reduce screen brightness.

The ability of the prisms 26 to bend or turn the incident image beam 16 permits the optical panel enclosure to be manufactured extremely thin. As initially shown in FIG. 1, the image beam 16 may be projected over the back, inlet side 22 of the panel either from below as illustrated, or from above if desired. The optical panel enclosure may be extremely thin by minimizing the angle of incidence of the image beam 16 over the inlet face and using the prisms for bending or turning the image beam for projection substantially perpendicularly outwardly from the screen 24.

In FIG. 2, the image beam 16 is shown as projecting upwardly at an angle of incidence A relative to the vertical plane of the inlet face. The incidence angle A has an acute value as little as about zero degrees and up to about 20 degrees, or higher as desired. The smaller the incidence angle, however, the thinner the overall depth of the enclosure surrounding the panel and mounted projector will be. The thickness T of the optical panel itself may be as little as about 6 mils for suitable light redirecting capability, but may be suitably thicker for increasing its structural rigidity if desired. The optical panel may be self supporting in the cabinet, if desired, or may be otherwise rigidly mounted around its perimeter, or on opposite sides.

In the exemplary embodiment illustrated in FIGS. 1–3, the optical panel 10 (i.e. body or film 20) may be formed of a commercially available turning film sold under the TRAF II trademark available from the 3M company of St. Paul, Minn. This acronym stands for Transmissive Right Angle Film which includes prismatic grooves defined between elongated triangular prisms. This film has a nominal thickness of about 155 microns, or about 6 mils, with prism angles B of 71 degrees. A typical prism pitch of 50 microns produces a substantial number or multitude of prisms per unit length, such as about two hundred per centimeter.

The body or film 20 having prisms thereon may be manufactured by pressing a heated steel platen against a plastic body or film. The heated steel platen contains grooves which are complimentary to that of the corresponding prisms. In an alternative manufacturing technique, the body or film 20 may be formed by applying liquid plastic through a plastic extrusion process. A body or film 20 composed of glass may be manufactured by pouring molten glass into a mold having surface contours corresponding to that of the prisms.

FIG. 3 illustrates in flowchart form an exemplary method of using the prismatic video display for forming, scaling and projecting the video image 16a, whose back silhouette is shown in FIG. 3, with FIG. 1 showing the actual image. The projector is disposed upbeam of the optical panel 10 and includes a modulator 14b for spatially modulating the initially plain light beam from the light source 14a to create the video image beam 16. The image beam 16 is projected over the entire inlet side 22 of the panel within which it is obliquely turned and displayed on the opposite screen 24 for direct viewing by the observer.

By aligning the projector to project the image light 16 at the acute incidence angle A against the prismatic first side of the panel, the overall depth of the display enclosure can be minimized, and the image light can be turned up to about 90° for viewing from the screen. Since the projector includes several components, those components may be located below, above, or even behind the panel in a compact assembly having minimum depth due to the edge-lighting capability of the panel. For the behind-mounted-projector configuration, suitable folding mirrors (not shown) would be used to direct the image beam over the panel inlet side.

FIG. 3 also illustrates schematically the two-dimensional spatial modulation of the plain source light for developing the individual pixels which form the resulting image pattern or beam 16. The exemplary modulator 14b may be a conventional LCD device operatively joined to an electrical controller 30 configured for generating any desired video image by spatial and temporal modulation of light. The controller 30 activates the individual pixels of the LCD to spatially modulate the light beam 16 in a lateral or horizontal axis X and in a transverse or vertical axis Y to form a two-dimensional image beam 16. The lateral axis X corresponds to the width axis of the panel 10, and the transverse axis Y corresponds to the height axis of the panel in this exemplary embodiment. Other types of modulators such as a conventional DMD device may alternatively be employed instead of an LCD device.

The imaging optics 14c cooperate with the modulator 14b for scaling the modulated image beam 16 from the relatively small modulator to the larger inlet side 22 of the panel for display from the screen 24. The imaging optics 14c may include lenses for scaling the image beam laterally and transversely as required to correspond with the full size of the panel inlet side 22. For example, the optics may be configured for expanding the image beam laterally in the X-axis across the full width of the panel; and expanding the image beam transversely in the Y-axis across the full height of the inlet side 22 within the narrow or acute angle of incidence thereto.

In this way, the optics 14c project the image beam 16 transversely across the prisms 26 which bend or re-direct the light inside the panel for transverse expansion at the screen. After the image beam is internally turned within the panel 10 itself, the resulting video image 16a displayed on the screen 24 has the proper relative width and height proportions for viewing of the image as intended, and without undesirable distortion.

The amount of scaling of the image beam is determined by the initial size of the image beam at the modulator 14b, the incidence angle at the inlet side 22, and the width and height of the panel. The optics control the required transition of the image from its initial size at the modulator to its final size over the entire screen 24. The optics may, therefore, either scale the image up from small size at the modulator to large size at the screen, or scale down from large size at the modulator to small size at the screen as desired.

The optical panel described above in various embodiments is surprisingly simple in configuration since it may be formed from a single continuous sheet of optically transparent film of extremely thin size of at least about 6 mils for example. The screen side of the film is relatively smooth and may be frosted as desired for diffusing the image beam for dispersing the video image. The serrated inlet side of the panel is configured with light-turning prisms for receiving the image beam from a projector at a shallow incidence angle. The panel may thusly be illuminated from along a single edge thereof for reducing the overall thickness of the panel in combination with the image projector. Thusly, only the panel itself is required for displaying the video image separately created by the video projector disposed upstream or upbeam therefrom.

The singular element optical panel accordingly has the capability for sharply turning the incident image beam up to about 90 degrees and simultaneously displaying the video image on its outlet screen without the need for additional panel layers. The image itself is separately created in the projector using a LCD, DMD, or other suitable light modulating device. The projector may be relatively small and the video image created therein may initially be quite small or compressed. The video image is then expanded as desired using suitable imaging optics for projection over the inlet side of the panel.

Accordingly, the optical panel itself may be as small or large as desired, with the video image projected thereon being controlled by the cooperating projector and included imaging optics. The panel is an efficient light guide maintaining high image brightness at the screen. And, the resulting image contrast is most pronounced in dark rooms in a manner superior to that of conventional CRTs, projection TVs, and LCDs.

The optical panel thusly enjoys substantial advantages in simplicity of construction and enhanced optical performance over known forms of displays including CRTs, projection TVs, and LCDs.

While there have been described herein what are considered to be preferred and exemplary embodiments of the present invention, other modifications of the invention shall be apparent to those skilled in the art from the teachings herein, and it is therefore desired to be secured in the appended claims all such modifications as fall within the true spirit and scope of the invention. For example, the optical panel 10 may consist of the body or film 20 itself or may include a diffuser 24a, a brightness enhancer such as a brightness enhancing film (BEF) commercially available from the 3M Corporation based in Minneapolis, Minn., and/or a black coating provided on at least a portion of the second facets 22b to improve contrast. The diffuser 24a and/or BEF, if employed, may be provided on the outlet screen 24

Figure 4:
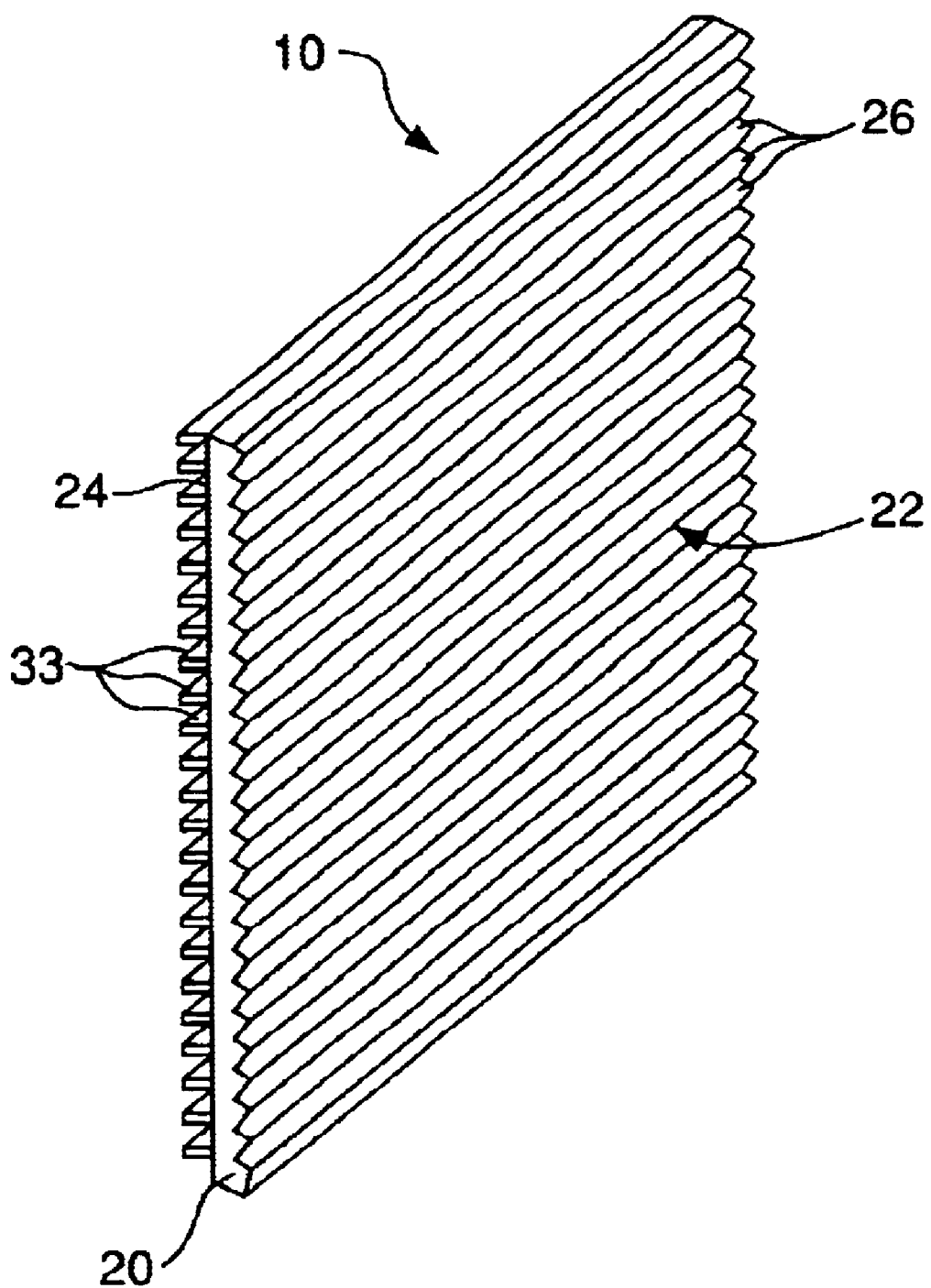
FIG. 4 is an isometric view of a video display including a louvered light control layer in accordance with another exemplary embodiment of the present invention.

Moreover, the optical panel 10 may optionally include a louvered light control layer 33 positioned on the outlet screen 24 as illustrated in FIG. 4. The louvered light control layer 33 may take any conventional form such that the light control layer 33 restricts viewing of the display to a narrower viewing range. The light control layer 33 may consist of only microlouvers or may comprise a thin plastic or glass film containing microlouvers. In either configuration, the microlouvers may preferably be comprised of a dark color, e.g. black, to absorb ambient light thereby enhancing display contrast. The light control layer 33 simulates tiny venetian blinds that shield out unwanted ambient light as well as direct display light to a desired location thereby providing controlled privacy viewing of the display with enhanced contrast. It should be understood that the orientation of the microlouvers may be configured as shown in FIG. 4 (i.e. having horizontal orientation paralleling the horizontal orientation of the prisms 26) or may instead be varied dependent on the degree or direction of light control desired. For example, the microlouvers each may extend vertically while the prisms 26 extend horizontally. The light control layer 33 may optionally be employed in conjunction with a diffuser 24a which may be positioned between the light control layer 33 and the body or film 20. The diffuser 24a may be of the type illustrated in FIG. 2 as described above.

Accordingly, what is desired to be secured by Letters Patent of the United States is the invention as defined and differentiated in the following claims in which We claim:

1. An optical display system for displaying a projected image, comprising:

a projector that projects an image beam that forms the projected image;

a prismatic optical panel, wherein said panel includes a prismatic first side optically aligned with said projector for receiving said image beam at an acute angle of incidence thereto, wherein said panel is effective for reflecting said image beam, wherein said panel displays said reflected image beam from an opposite second side thereof; and a light control layer at said panel second side, wherein said light control layer comprises microlouvers which direct the projected image to a desired location, and wherein said microlouvers are dark in color such that ambient light is absorbed thereby enhancing contrast of said projected image.

2. A display system according to claim 1 wherein said microlouvers are encased in a thin film comprised of plastic or glass.

3. A method of displaying a projected image, said method comprising the steps of:

projecting an image beam with a projector, said image beam forming the projected image;

receiving, turning, and displaying said image beam with a prismatic optical panel, wherein said panel includes a prismatic first side optically aligned with said projector, wherein said step of receiving said image beam occurs at an acute angle of incidence to the panel first side, wherein said step of displaying said image beam occurs at a panel second side which is opposite to the panel first side; and directing the projected image to a desired location with a light control layer at said panel second side, wherein said light control layer comprises microlouvers, and wherein said microlouvers are dark in color such that ambient light is absorbed thereby enhancing contrast of said projected image.

4. A method according to claim 3, wherein said microlouvers are encased in a thin film comprised of plastic or glass.

* * * * *